United States Patent [19]

Boeijen et al.

[11] Patent Number: 5,813,905
[45] Date of Patent: Sep. 29, 1998

[54] DEVICE AND APPARATUS FOR DEBONING HALVES OF SLAUGHTERED ANIMALS

[75] Inventors: Johannes Wilhelmus Boeijen, Oss; Maurice Eduardus Theodorus Van Esbroeck, Bemmel, both of Netherlands

[73] Assignee: Stork Protecon-Langen B.V., Netherlands

[21] Appl. No.: 798,109

[22] Filed: Feb. 12, 1997

Related U.S. Application Data

[63] Continuation-in-part of Ser. No. 251,846, May 31, 1994, abandoned.

[51] Int. Cl.[6] .................................................. A22C 17/04
[52] U.S. Cl. ............................................................. 452/135
[58] Field of Search ..................................... 452/136, 138, 452/135

[56] References Cited

U.S. PATENT DOCUMENTS

| 2,066,417 | 1/1937 | Nelms | 452/137 |
|---|---|---|---|
| 2,517,168 | 8/1950 | Bennek | 452/117 |
| 3,483,592 | 12/1969 | Aubert | 452/135 |
| 3,522,738 | 8/1970 | Zwiep et al. | 74/63 |
| 3,820,196 | 6/1974 | Penman | 452/137 |
| 4,577,369 | 3/1986 | Langen et al. | 452/138 |
| 4,901,399 | 2/1990 | Hegelmann | 452/138 |
| 4,945,607 | 8/1990 | Akesson et al. | 452/135 |
| 5,001,812 | 3/1991 | Hazenbroek | 452/135 |
| 5,203,736 | 4/1993 | Schulte et al. | 452/135 |
| 5,226,850 | 7/1993 | Klaassen | 452/171 |
| 5,228,881 | 7/1993 | Sekiguchi | 452/136 |
| 5,314,374 | 5/1994 | Koch et al. | 452/136 |
| 5,445,562 | 8/1995 | Brunell et al. | 452/138 |

FOREIGN PATENT DOCUMENTS

| 2642614 | 8/1990 | France | A22C 17/02 |
|---|---|---|---|
| 2644040 | 9/1990 | France | A22C 17/00 |
| 7317152 | 3/1974 | Netherlands | A22C 17/04 |
| 9100400 | 10/1992 | Netherlands | A22C 17/02 |
| 1488051 | 10/1977 | United Kingdom | A22C 17/00 |

*Primary Examiner*—Willis Little
*Attorney, Agent, or Firm*—Webb Ziesenheim Bruening Logsdon Orkin & Hanson, P.C.

[57] ABSTRACT

The invention has for its object to obviate the above stated drawbacks and proposes to this end a device which is distinguished in that it is embodied with at least two members for closing and opening respectively toward and away from each other, each of which is provided with a contour cutting edge which in the closed position of the members lie together.

34 Claims, 6 Drawing Sheets

DEVICE AND APPARATUS FOR DEBONING HALVES OF SLAUGHTERED ANIMALS

CROSS REFERENCE TO RELATED APPLICATION

This application is a continuation-in-part of U.S. application Ser. No. 08/251,846, filed May 31, 1994 and entitled "Device and Apparatus for Deboning Halves of Slaughtered Animals".

BACKGROUND OF THE INVENTION

The invention relates to a device for removing small bone remnants from pieces of meat, for instance halves of slaughtered animals such as pigs, and to an apparatus for deboning these halves.

A deboning apparatus is described in Dutch Application No. 9100400 with which it is possible to subject a half of a slaughtered animal to successive operations for removal of the ribs, spine and other bone parts. Dutch Application No. 9100400 is herein incorporated by reference.

In the removal of the spine, a saw-cut is made as closely as possible along the spine bone remnants, that is the protrusions of the vertebrae, remain behind in the meat. These bone parts or remnants, which are known as "meat eyes" in the relevant slaughtering art, must also be removed, for which purpose a proposal has been made for the use of a so-called hollow drill. However, such a hollow drill operates inaccurately and does not remove the bone remnants sufficiently. An excessive amount of meat is also removed with such a device.

SUMMARY OF THE INVENTION

The invention has for its object to obviate the above stated drawbacks and proposes to this end a device which is distinguished in that it is embodied with at least two members for closing and opening respectively toward and away from each other, each of which is provided with a contour cutting edge which in the closed position of the members lie together.

Due to the use of members closing against each other, the contour cutting edge related thereto can ensure that only the bone part is removed from the meat. The severed bone part is held fast between the closed members so that certain removal can take place.

In a preferred embodiment, the members are of cup-shaped form. The contour cutting edge is arranged on the free edge of the cup. With cup-shaped members, one bone remnant at a time can thus be taken hold of in the hollow space between the cup-shaped members. The cutting edges provide severing of the meat, membranes and sinews therearound, doing so as closely as possible to the bone remnant.

An exceptionally simple contour edge is obtained by grinding the edge of each cup-shaped member in facet form, whereby the bone surface is followed well and a good separation is achieved between bone and meat material.

According to one embodiment of the invention, the facet grinding on one cup can face inward, with the cutting edge of the inward facing facet grinding falling inside the cup-shaped space of the one member. A sort of shearing movement is effected herewith which ensures a certain severing of sinews and similar tough material.

One or both members can be embodied with bone removing means.

In another embodiment, the device is pneumatically operated. The pneumatic device has a substantially tubular, hollow support structure with a first portion and a second portion. The second portion extends substantially perpendicularly to a longitudinal axis L of the first portion and has a supporting edge located on an outer end thereof. A hose fitting is attached to one end of the first portion. A flexible vacuum hose is removably attached to the hose fitting and extends between the support structure and a vacuum source, such as a vacuum pump.

An air motor assembly is attached to the support structure by a bracket. A flexible air hose is removably attached to the hose fitting and extends between the air motor assembly and an air source. The air motor assembly includes a slidable and rotatable shaft with a cutting member attached to the outer end of the shaft. The cutting member is substantially concave, preferably cup-shaped, and includes an annular cutting edge.

BRIEF DESCRIPTION OF THE DRAWINGS

Above mentioned and other features will be further elucidated in the figure description hereinbelow of a number of embodiments. In the drawing.

DESCRIPTION OF THE PREFERRED EMBODIMENTS

Figure 1:
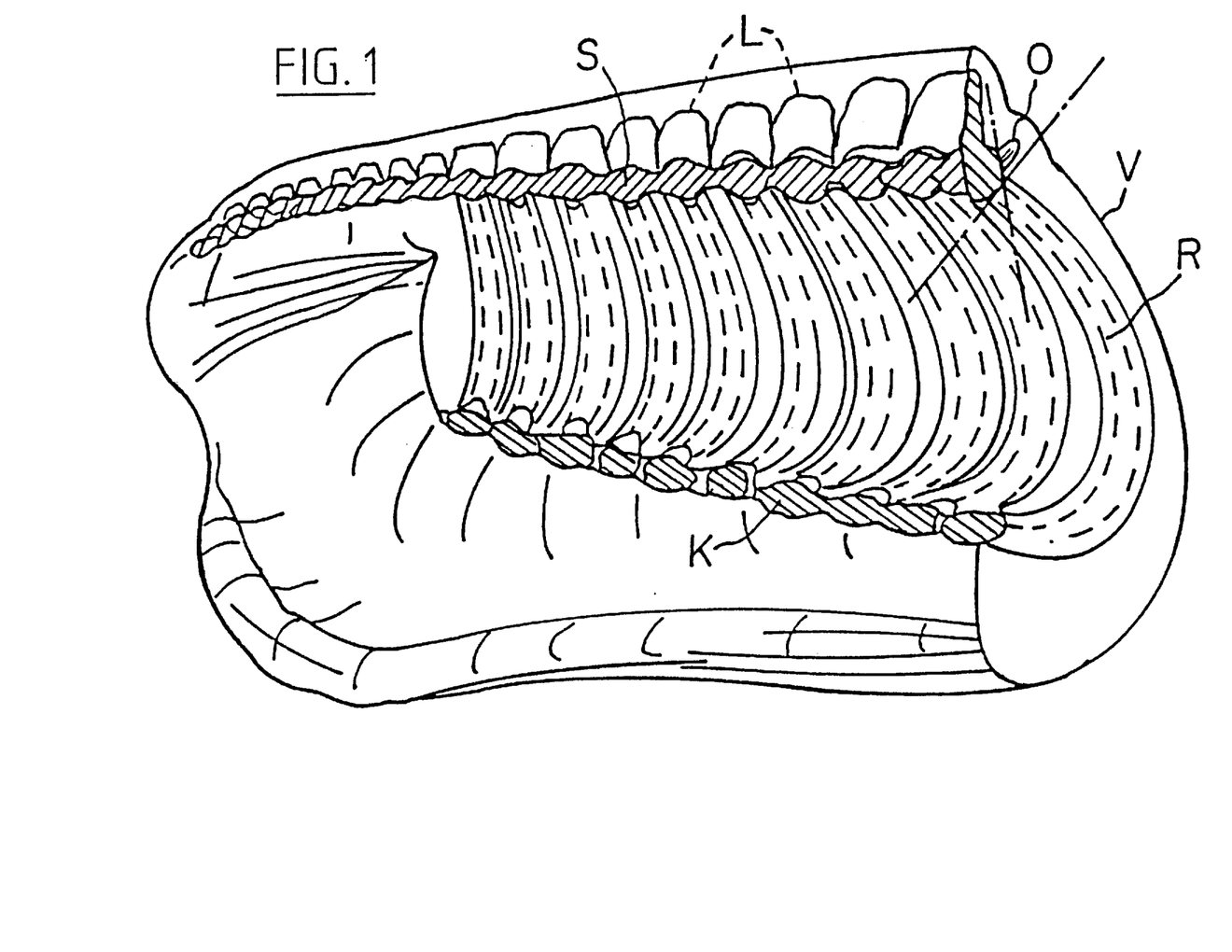
FIG. 1 shows a view of a half of a slaughtered animal from which the bones respectively bone remnants must be removed.

Shown schematically in perspective in FIG. 1 is a half of a slaughtered animal in which a half spine S is still located with ribs R joined thereto which end at the cartilage K on the side remote from the spine. One of the operations for removing the ribs from the spine is making a cut along the spine, wherein the vertebrae forming the spine are sawn partially through. Then left behind in the meat is a bone remnant O which must later be removed.

Figure 2:
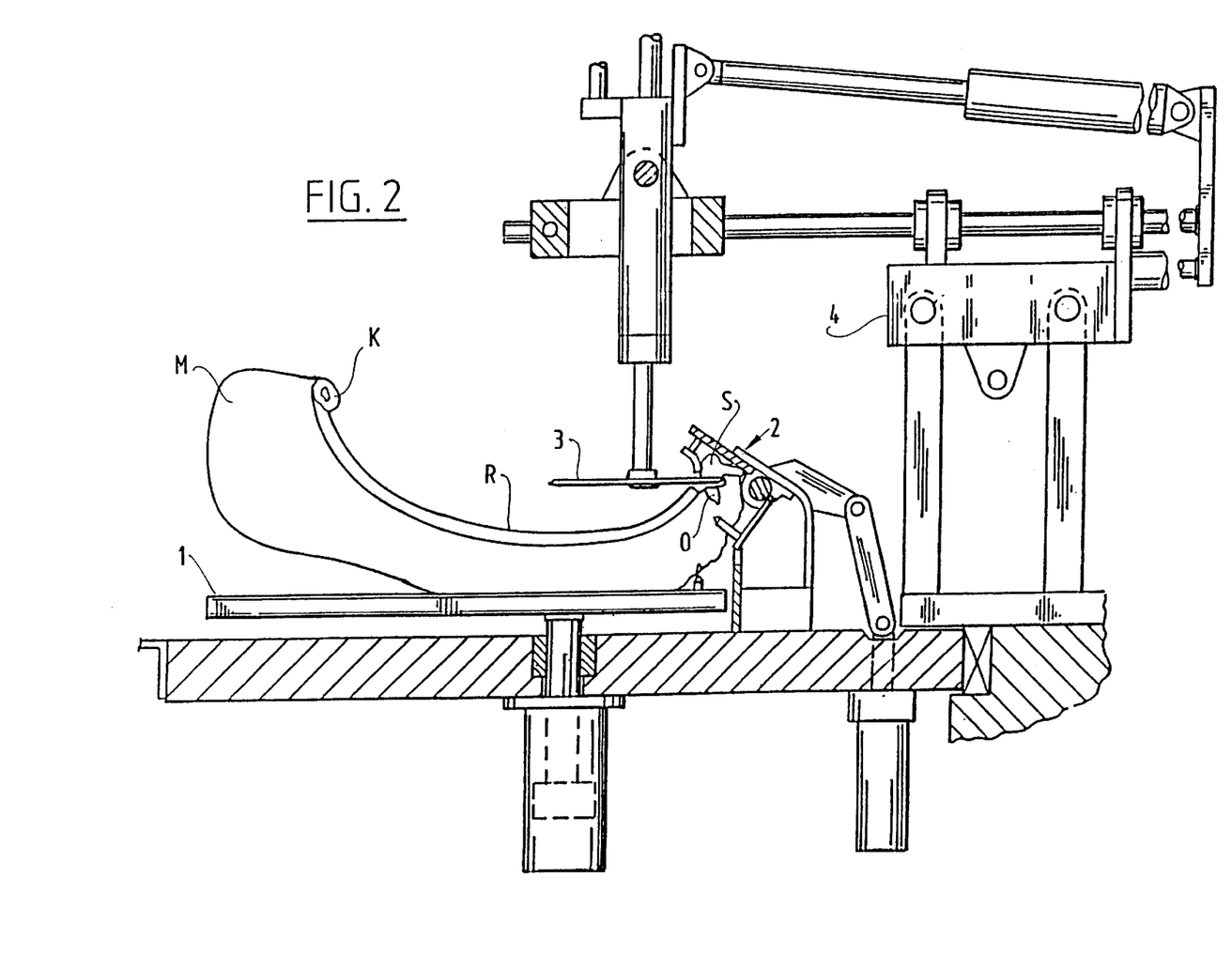
FIGS. 2 and 3 are each standing sections, shown schematically, of possible operations during the removal of the bones from a half.
Figure 3:
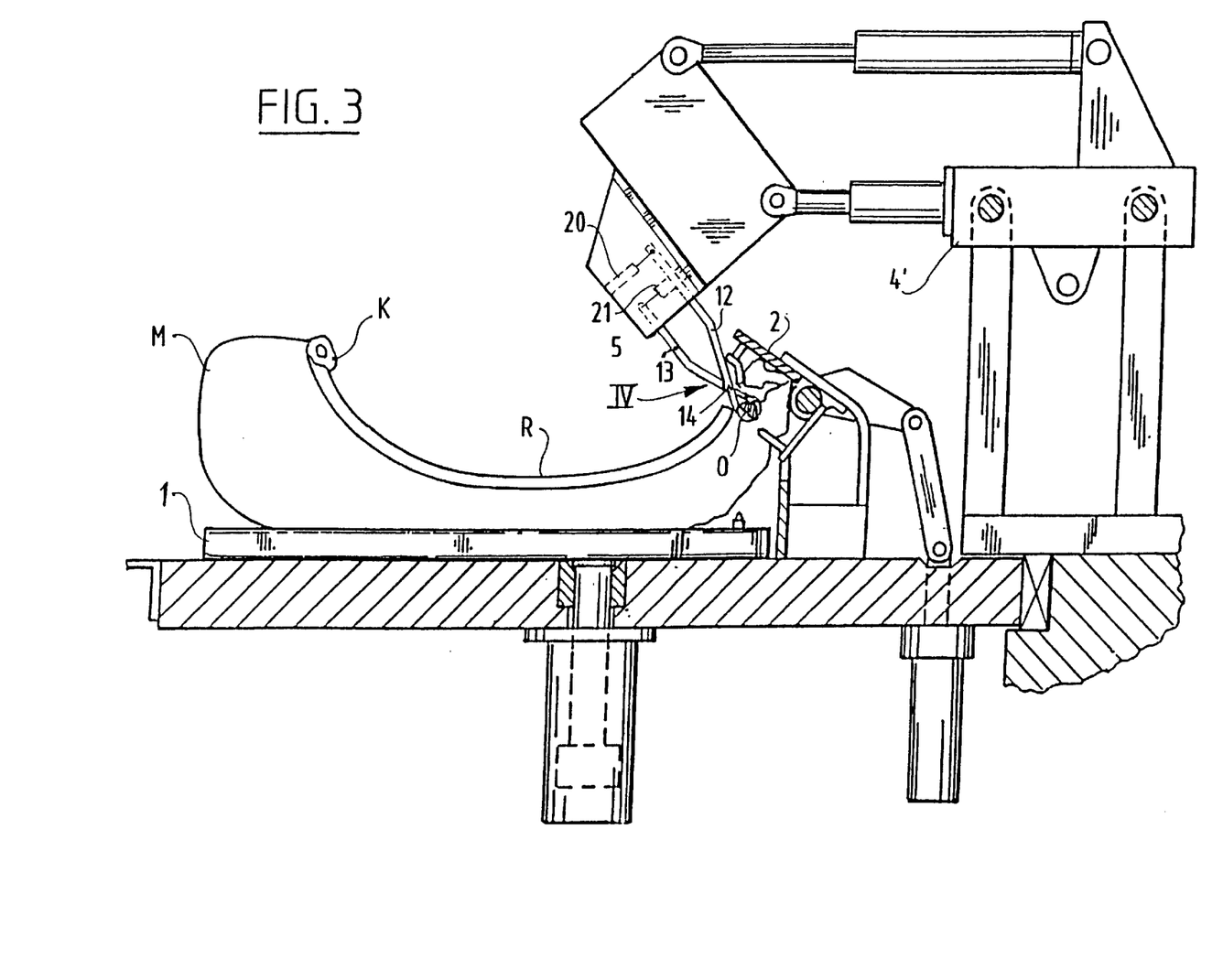

FIGS. 2 and 3 show in standing cross section a possible apparatus wherein only those members are shown with which a saw-cut can be made and with which a bone remnant O can be removed. The mechanism shown in FIGS. 2 and 3 has already been described in an earlier application and is herein assumed known. This apparatus comprises a table 1 with a clamping mechanism 2 on which the half is laid and fixedly clamped at the spine 5. The operation of table 1 and clamping mechanism 2 falls outside the scope of the present invention and is not further described. It is assumed that a saw-cut can be arranged in the half close to the spine S with a circular saw 3 which can be set into rotation by a motor (not shown) and which is supported in a carrier 4 which can be moved along table 1 in a direction at right angles to the plane of the drawing. As stated above, a bone remnant O remains behind after the cutting operation.

FIG. 3 shows a similar apparatus to that of FIG. 2. However, the carrier 4 is replaced by another carrier 4', on which the device 5 for removing the eye O is shown schematically.

This device 5 is shown in different variants in FIGS. 4–7.

Figure 4:
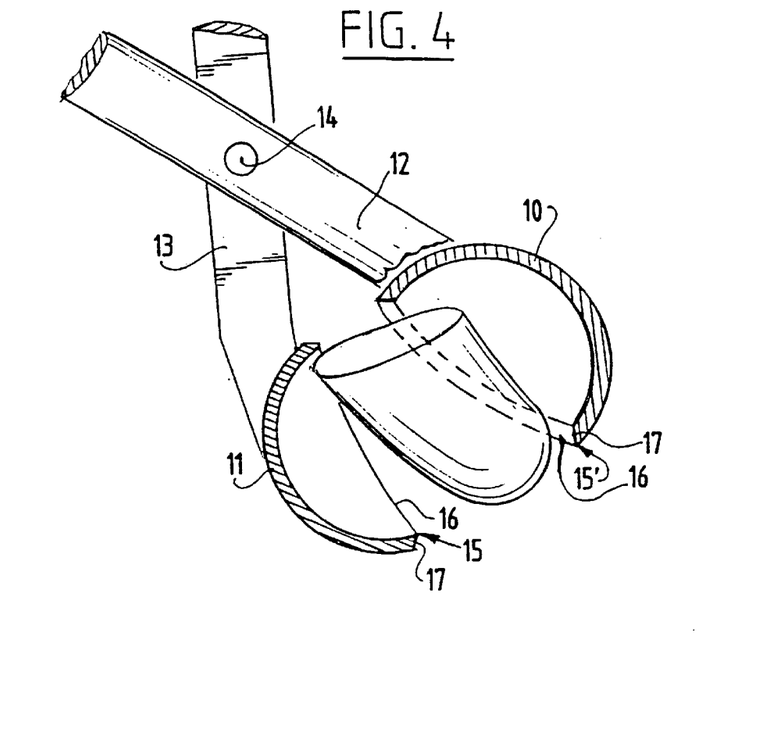
FIG. 4 is a top view of a device for removing bone remnants.
Figures 5, 6:
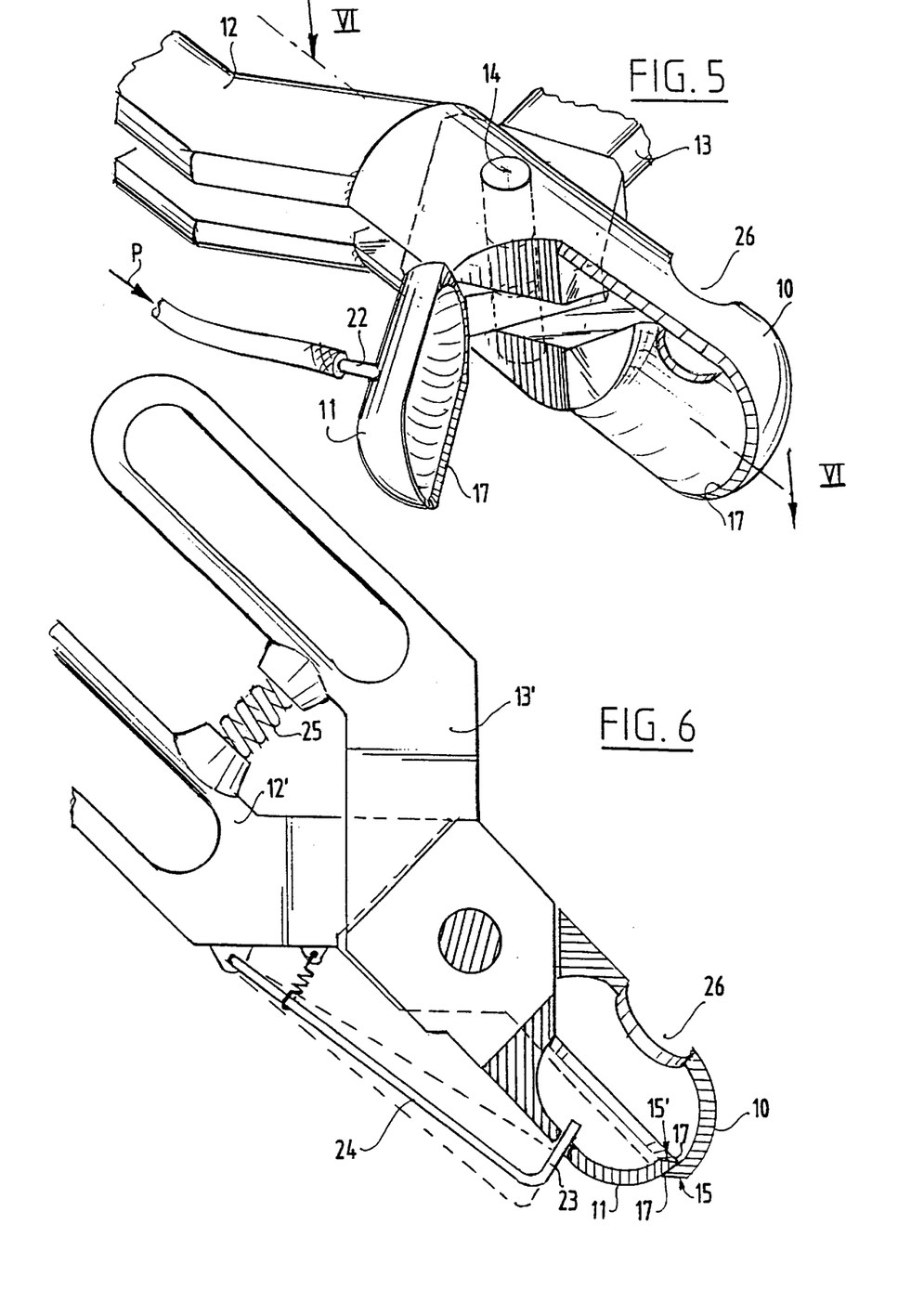
FIG. 5 shows another embodiment of the device of FIG. 4.
FIG. 6 is a cross section along the line VI—VI of the members of FIG. 5, in this case however of a hand operated device.
Figure 7:
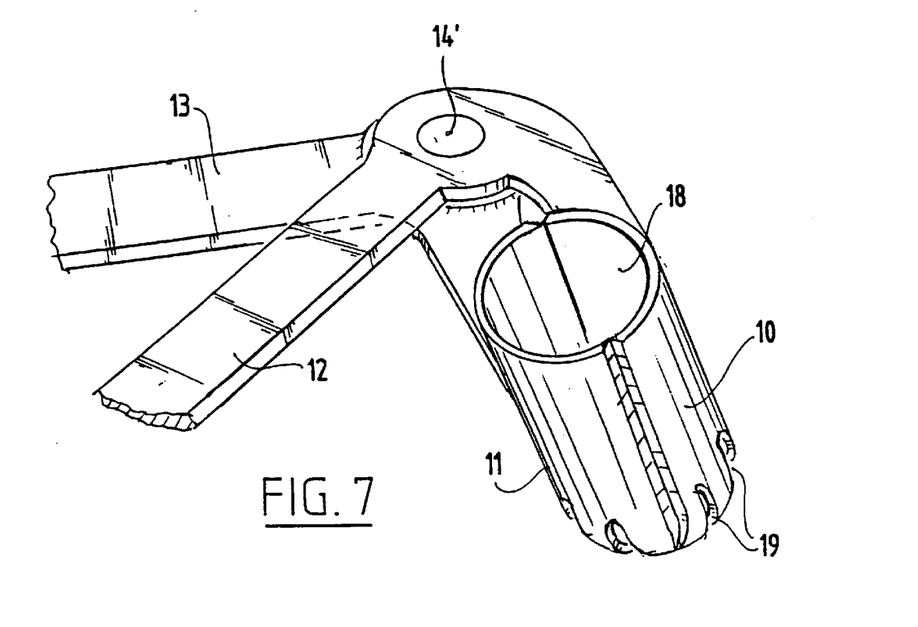
FIG. 7 shows a third variant of the device for removing bone remnants according to the invention.

In a preferred embodiment, the device includes two members 10, 11 which can be carried from an open position, shown in FIG. 4, to a closed position, shown for instance FIG. 6 and FIG. 7. For this purpose, the members 10, 11 are arranged on two arms 12 and 13 which can pivot relative to each other around a hinge pin 14.

Each member 10, 11 has a cup-like shape, wherein the free edge 15 can be embodied wholly or partially as a cutting edge 16 which is formed by grinding a faceted surface 17 along this edge 15. As shown in FIG. 4, the free edges 15, 15' of the one and the other member are such that they can co-act with each other and can sever the meat or other material round the bone remnant O. The total space in the closed position of both cup-like members is preferably large enough such that the bone remnant can be wholly contained therein.

Opening and closing of the two members 10 and 11 away from and toward each other can be carried out in various ways. One possibility is shown in FIG. 3. In this configuration, the arms 12 and 13 are lengthened beyond the point of rotation 14 and the ends of the arms are connected to cylinders 20, 21, respectively, which can be energized by a random machine operation. Locating the position of the bone remnant O in the half M and positioning the members 10 and 11 close to this bone remnant O can take place manually, semi-automatically or fully automatically using locating and detecting sensors (not shown).

It will be apparent that when the members 10, 11 are placed in the opened position close to bone piece O and subsequently penetrate into the half, the cutting edges 16 close to the bone piece O cut through or push back meat or other material so that when the members 10, 11 are closed, the piece of bone O can be wholly contained between the members 10, 11. The rest of the meat or other material joined thereto is cut off by the cutting edges 16 along the edge of the cup-like members 10, 11.

The embodiment of the invention shown in FIGS. 5 and 6 is a variant of the embodiment according to FIG. 4, with the cup-shaped members 10 and 11 being elongate. In addition, only a part of the peripheral edge 15 of the cup-shaped member is provided with a faceted surface 17, which for the one member 10 is chamfered or directed inwardly, see also FIG. 6. The peripheral edge 15 of the other member is moreover smaller than that of the one member 10, so that in the closed position of the members the peripheral edge 15', see FIG. 6, falls inside the space of the cup-shaped member 10. It can be seen clearly in FIG. 6 that a shearing action is brought about here, which guarantees a certain severing of tough material.

It is noted that the members 10, 11 are extended beyond the hinge pin with arms 12' and 13' which are embodied as handles. A manually operated device is thus obtained. An opening pressure spring 25 can optionally be arranged between the handles. It is further noted that member 10 in FIGS. 5 and 6 is provided with a passage opening 26 to remove cut out bone remnants from the closed cups without the cup-shaped members having to be opened. For forced removal of the bone remnants, a spray nozzle 22 can be arranged in the other or the same member, which spray nozzle 22 is connected to a pressure source P.

As shown in FIG. 6, the spray nozzle 22 can be replaced by a pressing pin 23 which is, for instance, manually operated, for which purpose the pin 23 is fixed to the end of a flexible or spring-loaded rod 24. The rod 24 can be pressed with a finger to press the pin 23 through an aperture and into the cup.

The operation of the embodiment according to FIGS. 5 and 6 is the same as that described with reference to FIG. 4.

A third variant of the cup-shaped members 10, 11 is shown in FIG. 7. The cup-shaped members 10, 11 are such in this embodiment that it is open on the top side 18. The form of the cup-shaped members 10, 11 is such that in the closed position, a cylinder-like form is obtained which closes on the underside in a substantially spherical shape. The underside is provided at 19 with apertures in order to facilitate penetration into the meat around the piece of bone remnant.

It is further noted that the rotation shaft 14' in this embodiment runs parallel to the centre line of the cylinder shape when the members 10, 11 are closed.

The operation of this variant is otherwise the same as that described with reference to FIG. 4.

Figure 8:
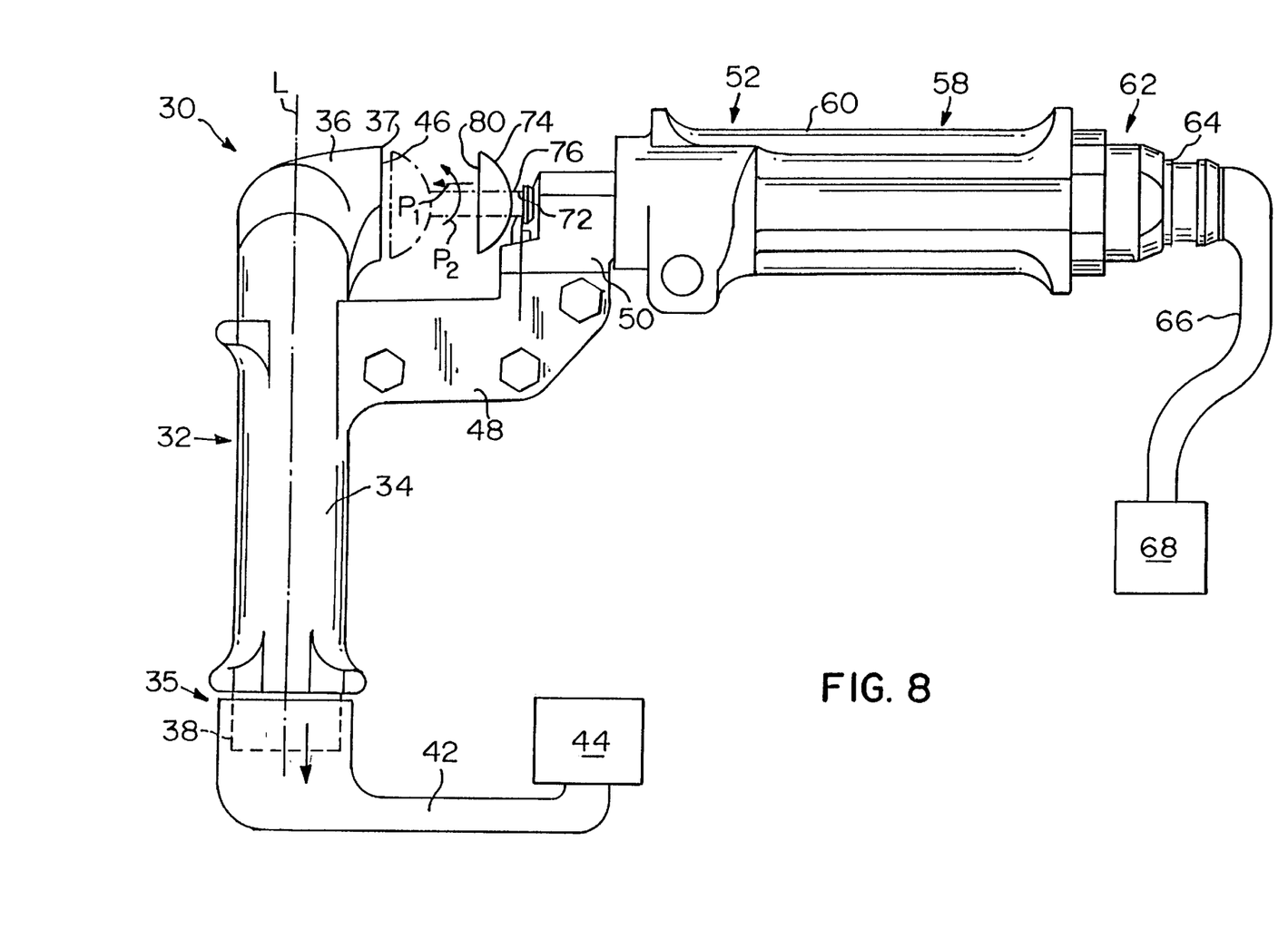
FIG. 8 shows a pneumatic embodiment of the device of the invention.

An alternative pneumatic device 30 of the invention for removing small bone parts from a piece of meat is shown in FIG. 8. The device 30 includes a substantially tubular, hollow support structure 32 having a first portion 34 with an open first end 35 and a second portion 36 having an open second end 37. The second portion 36 extends substantially perpendicularly to a longitudinal axis L of the first portion 34. A hose fitting 38 is mounted on the first end 35 of the first portion 34. A flexible vacuum hose 42 is removably attached to the hose fitting 38 and extends between the support structure 32 and a vacuum source, such as a vacuum pump 44.

The second portion 36 includes a substantially annular supporting edge 46 located on the second end 37 of the support structure 32. The supporting edge 46 surrounds the opening leading to the interior of the support structure 32. The second portion 36 is in flow communication with the first portion 34. A bracket 48 extends from the outer surface of the support structure 32. A sleeve element 50 is attached to the end of the bracket 48 remote from the support structure 32. A motor assembly 52 is attached to the sleeve element 50. The motor assembly 52 is preferably a pneumatic motor assembly and includes an air motor 58 having a housing 60. A second or outer end 62 of the housing 60 includes a hose fitting 64. A flexible air hose 66 is removably attached to the hose fitting 64 and extends between the air motor 58 and an air source 68. The motor assembly 52 includes a slidable and rotatable shaft 72 which extends from the air motor 58 and is supported in the sleeve element 50. A cutting member 74 is attached to a first or outer end 76 of the shaft 72. The cutting member 74 is preferably substantially bowl or cup-shaped and includes a hollow interior and an annular cutting edge 80. The cutting edge 80 lies in a plane substantially parallel to a plane containing the supporting edge 46.

The device 30 according to the invention is intended to be manipulated as follows.

The operator grips the device 30 by both hands, one around the housing 60 and one around the first portion 34 of the support structure 32. The operator positions the supporting edge 46 of the support structure 32 and the cutting edge 80 of the cutting member 74 adjacent the sides of the bone remnant to be removed. When the operator activates the air motor 58 in the housing 60, the shaft 72 is pushed to the left, as shown in FIG. 8. The cutting member 74 on the outer end 76 of the shaft 72 moves in the direction of arrow P1 toward the supporting edge 46 of the second portion 36. At a predetermined position, approximately half way between the starting position of the cutting member 74 and the supporting edge 46, the air motor 58 causes the shaft 72 to rotate as indicated by arrow P2, thus rotating the cup-like cutting member 74. The rotating cutting member 74 continues its path toward the supporting edge 46 until the final position indicated by broken lines in FIG. 8 is reached. In the final position, the cutting edge 80 of the cutting member 74 substantially abuts, but preferably does not touch, the supporting edge 46. The bone remnant is thus completely removed from the piece of meat and can be sucked off through the hollow support structure 32 into the vacuum hose 44 due to the vacuum created by the vacuum pump 44. Thereupon the cutting member 74 is retracted to the starting position.

The advantages of the device 30 according to the invention include the following: the operator is completely safeguarded as the operator's hands are not in the vicinity of the sharp cutting edge 80 when manipulating the device 30.

Further, when urging the cutting member 74 in the direction toward the supporting edge 46, the bone remnant will be lifted out of the surrounding meat by a certain height, so stressing the tissues and meat material, which will be cut through by the cutting edge 80. The cutting edge 80 preferably follows the surface of the bone as closely as possible. This has the result that the bone remnant is practically removed without meat (rests) sticking to the bone remnant. Due to the fact that the cutting edge 80 will never be in contact with the supporting edge 46, wear of the cutting edge 80 is diminished.

The starting distance between the cutting edge 80 and the supporting edge 46 can be set at a predetermined distance, so making the device adaptable to smaller and larger bone remnants.

Due to the fact that the operator will never touch the bone remnants by hand, the repetitions of the bone-removing and handling are enhanced, so making the device more efficient.

Within the scope of the invention, it is also possible that the cutting member 74 has other forms. For example, it can also be substantially cylindrical, with orifices in the wall of the cutting member 74 in order to let air come inside when suction is generated in the support structure 32. As there is preferably no contact between the cutting edge 80 and the supporting edge 46, it is not necessary to have a continuous supporting edge 46. For example, the supporting edge 46 can be shaped as half a circle, being that part which will come into contact of the piece of meat.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiment described in detail herein are illustrative only and are not limiting to the scope of the invention which is to be given the full breadth of the appended claims and any and all equivalents thereof.

What is claimed is:

1. A device for removing small bone remnants from pieces of meat, comprising: at least two members configured to close and open toward and away from each other, each of which is provided with a contour cutting edge, wherein in a closed position of the members the contour cutting edges abut each other, wherein at least one of the members has a cup-shaped form to receive the bone remnant to be removed, and wherein in the closed position a hollow space is formed between the closed members such that the bone remnant is wholly contained within the hollow space.

2. The device as claimed in claim 1, wherein the members are arranged for rotation relative of each other round a hinge pin.

3. The device as claimed in claim 2, further including a bone removing means arranged in at least one of the members.

4. The device as claimed in claim 2, wherein at least one of the members is extended beyond the hinge pin with a handle to form a hand-operated tool.

5. The device as claimed in claim 4, further including a bone removing means arranged in at least one of the members.

6. The device as claimed in claim 1, further including a bone removing means arranged in at least one of the members.

7. A device for removing small bone remnants from pieces of meat, comprising:
   at least two members for closing and opening respectively toward and away from each other, each of which is provided with a contour cutting edge, wherein in a closed position of the members the contour cutting edges abut each other,
   wherein each of the members has a cup-shaped form, wherein the contour cutting edge is arranged on a free edge of the cup-shaped form, and wherein in the closed position a hollow space is formed between the closed members such that the bone remnant is wholly contained within the hollow space.

8. The device as claimed in claim 2, wherein the cutting edge is a facet ground cup edge.

9. The device as claimed in claim 8, wherein the members are arranged for rotation relative of each other round a hinge pin.

10. The device as claimed in claim 8, wherein at least one of the cup-shaped members is provided with a passage opening.

11. The device as claimed in claim 8, further including a bone removing means arranged in at least one of the members.

12. The device as claimed in claim 11, wherein said bone removing means includes a spray nozzle disposed in at least one member, with said spray nozzle connected to a pressurized fluid source.

13. The device as claimed in claim 11, wherein said bone removing means includes a pressing pin affixed to an end of a rod, wherein said pin can be pressed via an aperture into at least one of said members.

14. The device as claimed in claim 7, wherein at least one of the cup-shaped members is provided with a passage opening.

15. The device as claimed in claim 14, further including a bone removing means arranged in at least one of the members.

16. The device as claimed in claim 7, wherein the members are arranged for rotation relative of each other round a hinge pin.

17. A device for removing small bone remnants from pieces of meat, comprising:
   at least two members for closing and opening respectively toward and away from each other, each of which is provided with a contour cutting edge which in the closed position of the members lie close together, wherein each of the members has a cup-shaped form and wherein the contour cutting edge is arranged on a free edge of the cup-shaped form, wherein the cutting edge is a facet ground cup edge, and wherein the facet edge of one cup-shaped member is directed outward and that of another member is directed inward and wherein the cup edge of the other member falls inside a cup-shaped space of the one member.

18. The device as claimed in claim 7, wherein the members are arranged for rotation relative of each other round a hinge pin.

19. The device as claimed in claim 17, wherein at least one of the cup-shaped members is provided with a passage opening.

20. The device as claimed in claim 17, further including a bone removing means arranged in at least one of the members.

21. A device for removing small bone remnants from pieces of meat, comprising:
- at least two members for closing and opening toward and away from each other, each of which is provided with a contour cutting edge which in a closed position of the members lie close together; and
- a bone removing means arranged in at least one of the members, wherein at least one of the members has a cup-shaped form to receive the bone remnant to be removed, and wherein said bone removing means includes a spray nozzle disposed in at least one member, with said spray nozzle connected to a pressurized fluid source.

22. A device for removing small bone remnants from pieces of meat, comprising:
- at least two members for closing and opening toward and away from each other, each of which is provided with a contour cutting edge which in a closed position of the members lie close together; and
- a bone removing means arranged in at least one of the members, wherein at least one of the members has a cup-shaped form to receive the bone remnant to be removed, and wherein said bone removing means includes a pressing pin affixed to an end of a rod, wherein said pin can be pressed through an aperture into at least one of said members.

23. A device for removing bone remnants from pieces of meat, said device comprising:
- a support structure having a supporting edge;
- a motor assembly; and
- a cutting member slidably and rotatably mounted on said motor assembly, said cutting member having a cutting edge, wherein said motor assembly is configured to move said cutting member toward said supporting edge until said cutting edge substantially abuts said supporting edge.

24. The device as claimed in claim 23, wherein said support structure is hollow and includes a first portion in flow communication with a second portion.

25. The device as claimed in claim 24, wherein said second portion extends substantially perpendicularly to a longitudinal axis of said first portion, said second portion includes a second end and said supporting edge is located on said second end of said second portion.

26. The device as claimed in claim 23, wherein said motor assembly includes an air motor, said air motor includes a shaft slidably and rotatably mounted in said air motor, said shaft includes a first end and said cutting member is attached to said first end of said shaft.

27. The device as claimed in claim 23, wherein said cutting member is substantially cup-shaped.

28. The device as claimed in claim 23, wherein said supporting edge is located substantially in a first plane, said cutting edge is located substantially in a second plane, and said first plane is substantially parallel to said second plane.

29. The device as claimed in claim 23, wherein said supporting edge is substantially annular.

30. The device as claimed in claim 23, wherein said motor assembly includes an air motor having a housing and wherein an air hose fitting is located on said housing.

31. A pneumatic device for removing bone remnants from pieces of meat, said device comprising:
- a hollow support structure having a substantially annular supporting edge, said supporting edge located in a first plane;
- a pneumatic motor assembly attached to said support structure;
- a shaft slidably and rotatably mounted in said motor assembly, said shaft having a first end; and
- a cutting member attached to said first end of said shaft, said cutting member having a hollow interior and a cutting edge, with said cutting edge located in a second plane, wherein said first plane is substantially parallel to said second plane, and wherein said motor assembly is configured to move said cutting member toward said supporting edge until said cutting edge substantially abuts said supporting edge.

32. The device as claimed in claim 31, wherein said support structure includes a first portion and a second portion, wherein said second portion extends substantially perpendicular to a longitudinal axis of said first portion and includes a second end, and wherein said supporting edge is located on said second end of said second portion.

33. The device as claimed in claim 32, wherein said first portion of said support structure includes a first end having a vacuum hose fitting, said device further including a vacuum pump and a vacuum hose, with said vacuum hose removably attached to said vacuum hose fitting and extending between said vacuum pump and said first portion.

34. The device as claimed in claim 33, wherein said pneumatic motor assembly includes a housing having an air hose fitting, said device further including an air hose and an air source, with said air hose removably attached to said air hose fitting and extending between said air source and said housing.

* * * * *

UNITED STATES PATENT AND TRADEMARK OFFICE
CERTIFICATE OF CORRECTION

PATENT NO. : 5,813,905
DATED : September 29, 1998
INVENTOR(S) : Johannes Wilhelmus Boeijen et al.

It is certified that error appears in the above-identified patent and that said Letters Patent is hereby corrected as shown below:

Claim 8 Column 6 Line 34 "in claim 2" should read
--in claim 7--.

Claim 18 Column 7 Line 10 "in claim 7" should read
--in claim 17--.

Signed and Sealed this

Sixth Day of April, 1999

Attest:

Attesting Officer

Q. TODD DICKINSON

Acting Commissioner of Patents and Trademarks